(12) United States Patent
Kubo et al.

(10) Patent No.: US 7,205,357 B2
(45) Date of Patent: Apr. 17, 2007

(54) POLYESTER RESIN COMPOSITION FOR TONER

(75) Inventors: Takashi Kubo, Wakayama (JP); Katsutoshi Aoki, Wakayama (JP); Eiji Shirai, Wakayama (JP)

(73) Assignee: Kao Corporation, Tokyo (JP)

( * ) Notice: Subject to any disclaimer, the term of this patent is extended or adjusted under 35 U.S.C. 154(b) by 145 days.

(21) Appl. No.: 10/693,881

(22) Filed: Oct. 28, 2003

(65) Prior Publication Data

US 2004/0086797 A1  May 6, 2004

(30) Foreign Application Priority Data

Oct. 29, 2002  (JP) .............................. 2002-314702

(51) Int. Cl.
*C08K 3/32* (2006.01)
*C08G 9/087* (2006.01)
*G03G 63/16* (2006.01)

(52) U.S. Cl. ...................... 524/706; 528/274; 528/275; 528/277; 528/279; 528/286; 430/109.1; 430/109.4

(58) Field of Classification Search ................ 528/272, 528/274, 277, 279, 286, 287; 430/109.4, 430/109, 109.1; 524/706
See application file for complete search history.

(56) References Cited

U.S. PATENT DOCUMENTS

| | | | | |
|---|---|---|---|---|
| 3,953,539 A | * | 4/1976 | Kawase et al. | 524/116 |
| 3,965,071 A | * | 6/1976 | McClelland | 528/279 |
| 4,217,440 A | * | 8/1980 | Barkey | 528/274 |
| 4,789,613 A | * | 12/1988 | Ohtani et al. | 430/108.3 |
| 5,453,479 A | * | 9/1995 | Borman et al. | 528/279 |
| 5,519,112 A | * | 5/1996 | Harazoe et al. | 528/481 |
| 5,637,427 A | * | 6/1997 | Yamamoto et al. | 430/45 |
| 5,681,918 A | * | 10/1997 | Adams et al. | 528/279 |
| 5,922,828 A | * | 7/1999 | Schiraldi | 528/279 |
| 2002/0098972 A1 | * | 7/2002 | Duan | 502/150 |

FOREIGN PATENT DOCUMENTS

| | | |
|---|---|---|
| JP | 5-134454 | 5/1993 |
| JP | 5-224461 | 9/1993 |
| JP | 6-41288 | 2/1994 |
| JP | 7-98518 | 4/1995 |
| JP | 7-242742 | 9/1995 |
| JP | 8-305083 | 11/1996 |
| JP | 2000-284537 | 10/2000 |
| JP | 2000-284538 | 10/2000 |
| JP | 2001-114887 | 4/2001 |
| JP | 2001-200046 | 7/2001 |
| JP | 2002-123034 | 4/2002 |
| JP | 2002-202637 | 7/2002 |
| WO | WO 96/02870 | 2/1996 |
| WO | WO 02/16467 A1 | 2/2002 |

* cited by examiner

*Primary Examiner*—Vasu Jagannathan
*Assistant Examiner*—Vickey Ronesi
(74) *Attorney, Agent, or Firm*—Oblon, Spivak, McClelland, Maier & Neustadt, P.C.

(57) ABSTRACT

A polyester resin composition for a toner comprising a titanium compound in an amount of from 0.005 to 4% by weight, and an inorganic phosphorus compound in an amount of from 0.001 to 5% by weight; a toner comprising the polyester resin composition as defined above; and a process for preparing the polyester resin composition for a toner as defined above, comprising the step of polycondensing the raw material monomers for the polyester in the presence of a titanium compound and an inorganic phosphorus compound. The polyester resin composition for a toner is suitably used as a resin binder for a toner for developing a latent image formed in electrophotography, electrostatic recording method, electrostatic printing method or the like, a process for preparing the same, and a toner comprising the polyester resin composition.

5 Claims, No Drawings

POLYESTER RESIN COMPOSITION FOR TONER

FIELD OF THE INVENTION

The present invention relates to a polyester resin composition for a toner which is suitably used as a resin binder for a toner for developing a latent image formed in electrophotography, electrostatic recording method, electrostatic printing method or the like, a process for preparing the same, and a toner comprising the polyester resin composition.

BACKGROUND OF THE INVENTION

In color toners it is important to have a broad color reproducible region. For this purpose, a linear, low molecular weight-resin having an excellent transparency is mainly used as a resin binder, and the durability thereof, a contradictory property, needs to be improved.

On the other hand, from the viewpoint of the color reproducibility, there have been known a method comprising adding to a toner an additive such as a colorant which has a vivid color and hardly discolors, and a colorless charge control agent, and an ultraviolet absorbent, and a method comprising reacting raw material monomers under a nitrogen atmosphere or under high vacuum in order to improve the color tone of a polyester itself (Japanese Patent Laid-Open No. Hei 8-253562 (U.S. Pat. No. 5,807,654)).

However, the color reproducibility of the color toners is insufficient in both of the above methods. Further improvement in the color reproducibility as well as the durability has been desired.

SUMMARY OF THE INVENTION

The present invention relates to:
(1) a polyester resin composition for a toner comprising:
   a titanium compound in an amount of from 0.005 to 4% by weight, and
   an inorganic phosphorus compound in an amount of from 0.001 to 5% by weight;
(2) a toner comprising the polyester resin composition as defined in the above (1); and
(3) a process for preparing the polyester resin composition for a toner as defined in the above (1), comprising the step of polycondensing the raw material monomers for the polyester in the presence of a titanium compound and an inorganic phosphorus compound.

DETAILED DESCRIPTION OF THE INVENTION

All publications cited herein are hereby incorporated by reference.

The present invention relates to a polyester resin composition for a toner, which is excellent in the durability and has an excellent color reproducibility when used as a resin binder for a color toner or a full-color toner, a process for preparing the same, and a toner comprising the polyester resin composition.

These and other advantages of the present invention will be apparent from the following description.

The present inventors have initially thought that the above problems can be solved by preparing a resin having high durability and high transparency. However, even when an easily colored polyester prepared by using an alkenylsuccinic acid compound as one of the raw materials is used, it has been found that a color toner excellent in the color reproducibility can be obtained (see Comparative Example 7 set forth below), and that there is an important factor for the color reproducibility of a color toner in addition to coloration of the resin. Therefore, the present inventors have conducted further studies. As a result, the present inventors have found that both of the durability and the color reproducibility of the toner can be improved by providing a polyester resin composition comprising an inorganic phosphorus compound together with a titanium compound used as a catalyst for polymerizing a polyester, and the present invention has been thus accomplished thereby.

The polyester resin composition for a toner of the present invention comprises a titanium compound, an inorganic phosphorus compound and a polyester.

The titanium compound in the polyester resin composition of the present invention is not particularly limited, as long as the titanium compound acts as a catalyst for a condensation polymerization of a polyester. The titanium compound is preferably a titanium compound having a Ti—O bond, more preferably a compound having an alkoxy group, alkenyloxy group or acyloxy group, each having a total number of carbon atoms of from 1 of 28, even more preferably a titanium compound represented by the formula (I):

$$\mathrm{Ti}(X)_n(Y)_m \qquad (I)$$

wherein X is a substituted amino group having a total number of carbon atoms of from 1 to 28; Y is an alkoxy group, alkenyloxy group or acyloxy group, preferably an alkoxy group, each having a total number of carbon atoms of from 1 to 28; and each of n and m is an integer of from 1 to 3, wherein a sum of n and m is 4; and a titanium compound represented by the formula (II):

$$\mathrm{Ti}(Z)_4 \qquad (II)$$

wherein Z is an alkoxy group, alkenyloxy group or acyloxy group, preferably an alkoxy group, each having a total number of carbon atoms of from 1 to 28, wherein the four kinds of Z may be identical or different from each other. The titanium compounds may be used alone, or in admixture thereof.

In the formula (I), the substituted amino group represented by X has a total number of carbon atoms of preferably from 2 to 10, more preferably from 4 to 8, even more preferably 6. The "substituted amino group" in the present invention means a group containing nitrogen atom which can be directly bonded to titanium atom, and includes an alkylamino group which may be substituted by hydroxyl group. A quaternary cationic group is also included in the substituted amino group, and the quaternary cationic group is preferable. The substituted amino group can be formed, for instance, by reacting a titanium halide with an amine compound. The amine compound includes alkanolamine compounds such as monoalkanolamine compounds, dialkanolamine compounds and trialkanolamine compounds; alkylamine compounds such as trialkylamine compounds; and the like. Among them, the alkanolamines are preferable, and the trialkanolamines are more preferable.

In addition, the group represented by Y has a total number of carbon atoms of preferably from 1 to 6, more preferably from 2 to 5.

Further, from the viewpoint of the effects of the present invention, it is preferable that the group represented by X has a greater total number of carbon atoms than the group represented by Y. Also, a difference in the total number of carbon atoms between the group represented by X and the group represented by Y is preferably from 1 to 6, more preferably from 2 to 4.

Concrete examples of the titanium compound represented by the formula (I) include:
titanium diisopropylate bis(triethanolaminate) [Ti($C_6H_{14}O_3N$)$_2$($C_3H_7O$)$_2$],
titanium diisopropylate bis(diethanolaminate) [Ti($C_4H_{10}O_2N$)$_2$($C_3H_7O$)$_2$],
titanium dipentylate bis(triethanolaminate) [Ti($C_6H_{14}O_3N$)$_2$($C_5H_{11}O$)$_2$],
titanium diethylate bis(triethanolaminate) [Ti($C_6H_{14}O_3N$)$_2$($C_2H_5O$)$_2$],
titanium dihydroxyoctylate bis(triethanolaminate) [Ti($C_6H_{14}O_3N$)$_2$(OHC$_8H_{16}O$)$_2$],
titanium distearate bis(triethanolaminate) [Ti($C_6H_{14}O_3N$)$_2$($C_{18}H_{37}O$)$_2$],
titanium triisopropylate triethanolaminate [Ti($C_6H_{14}O_3N$)$_1$($C_3H_7O$)$_3$],
titanium monopropylate tris(triethanolaminate) [Ti($C_6H_{14}O_3N$)$_3$($C_3H_7O$)$_1$],
and the like. Among them, titanium diisopropylate bis (triethanolaminate), titanium diisopropylate bis(diethanolaminate) and titanium dipentylate bis(triethanolaminate) are preferable, which are available as marketed products of Matsumoto Trading Co., Ltd.

In the formula (II), the group represented by Z has a total number of carbon atoms of preferably from 8 to 28, more preferably from 12 to 24, even more preferably from 16 to 20.

In the formulas (I) and (II), each of the group represented by Y and the group represented by Z may have a substituent such as hydroxyl group or a halogen, and those which are unsubstituted or have hydroxyl group as a substituent are preferable, and those which are unsubstituted are more preferable.

A total number of carbon atoms for Y or Z means the number including the number of carbon atoms in the substituent.

In addition, the four kinds of groups represented by Z may be identical or different, and all of these four kinds of groups are preferably identical from the viewpoints of reaction activity and hydrolytic resistance.

Concrete examples of the titanium compound represented by the formula (II) include:
tetra-n-butyl titanate [Ti($C_4H_9O$)$_4$], tetrapropyl titanate [Ti($C_3H_7O$)$_4$],
tetrastearyl titanate [Ti($C_{18}H_{37}O$)$_4$], tetramyristyl titanate [Ti($C_{14}H_{29}O$)$_4$],
tetraoctyl titanate [Ti($C_8H_{17}O$)$_4$],
dioctyl dihydroxyoctyl titanate [Ti($C_8H_{17}O$)$_2$(OHC$_8H_{16}O$)$_2$],
dimyristyl dioctyl titanate [Ti($C_{14}H_{29}O$)$_2$($C_8H_{17}O$)$_2$],
and the like. Among them, tetrastearyl titanate, tetramyristyl titanate, tetraoctyl titanate and dioctyl dihydroxyoctyl titanate are preferable. These titanium compounds can be obtained by, for instance, reacting a titanium halide with a corresponding alcohol, and are also available as marketed products of Nisso.

The inorganic phosphorus compound in the present invention refers to a phosphorus compound having no carbon atom. Specifically, inorganic phosphoric acids and salts thereof are preferable, and inorganic phosphoric acids are more preferable. The inorganic phosphoric acids include orthophosphoric acid; pyrophosphoric acid, metaphosphoric acid, polyphosphoric acids such as triphosphoric acid and tetraphosphoric acid, which are dehydration condensates of orthophosphoric acid; phosphorus pentoxide; and the like. In the present invention, polyphosphoric acids commercially available as a mixture of the phosphoric acids mentioned above are preferable. The salts of inorganic phosphoric acids include, for instance, in the case of orthophosphoric acid, normal salts represented by $M^I_3PO_4$ and $M^{II}_3(PO_4)_2$, dihydrogen salts represented by $M^IH_2PO_4$ and $M^{II}(H_2PO_4)_2$, and monohydrogen salts represented by $M^I_2HPO_4$ and $M^{II}HPO_4$. Among them, salts containing $M^I$ are preferable. The $M^I$ includes Na, K, NH$_4$ and the like, among which Na is preferable. Also, the $M^{II}$ includes Mg, Ca and the like. The cationic components ($M^I$ and $M^{II}$) in salts of pyrophosphoric acid, salts of metaphosphoric acid, and salts of polyphosphoric acids are the same ones as those exemplified above. The number-average molecular weight of polyphosphoric acid (or salts thereof) is preferably from 110 to 1000, more preferably from 150 to 800, even more preferably from 250 to 700.

The raw material monomers for the polyester include an alcohol component comprising a dihydric or higher polyhydric alcohol and a carboxylic acid component comprising a dicarboxylic or higher polycarboxylic acid compound.

The dihydric alcohol includes an alkylene(2 to 4 carbon atoms) oxide(average number of moles: 1.5 to 6) adduct of bisphenol A such as polyoxypropylene(2.2)-2,2-bis(4-hydroxyphenyl)propane and polyoxyethylene(2.2)-2,2-bis(4-hydroxyphenyl)propane, ethylene glycol, propylene glycol, neopentyl glycol, 1,4-butanediol, 1,3-butanediol, 1,6-hexanediol, and the like.

The trihydric or higher polyhydric alcohol includes, for instance, sorbitol, pentaerythritol, glycerol, trimethylolpropane, and the like.

Among the polyhydric alcohols, from the viewpoints of triboelectric chargeability and durability, an alcohol having a bisphenol A backbone such as an alkylene oxide adduct of bisphenol A and the like is preferred. The content of the alcohol having a bisphenol A backbone in the alcohol component is preferably from 10 to 100% by mol, more preferably from 50 to 100% by mol, especially 100% by mol.

The dicarboxylic acid compound includes aromatic dicarboxylic acids such as phthalic acid, terephthalic acid and isophthalic acid; aliphatic dicarboxylic acids such as sebacic acid, fumaric acid, maleic acid, adipic acid, azelaic acid, a substituted succinic acid of which substituent is an alkyl group having 1 to 20 carbon atoms or an alkenyl group having 2 to 20 carbon atoms, such as dodecenylsuccinic acid and dodecylsuccinic acid; alicyclic dicarboxylic acids such as cyclohexanedicarboxylic acid; acid anhydrides thereof; alkyl(1 to 3 carbon atoms) esters thereof, and the like.

The tricarboxylic or higher polycarboxylic acid compound includes aromatic carboxylic acids such as 1,2,4-benzenetricarboxylic acid (trimellitic acid), 2,5,7-naphthalenetricarboxylic acid, pyromellitic acid, derivatives such as acid anhydrides thereof, alkyl(1 to 3 carbon atoms) esters thereof, and the like.

The polyester resin composition of the present invention can widen the color reproducible region for a toner. Therefore, when an alkenyl-substituted succinic acid compound which is likely to cause coloration of the polyester is used as a carboxylic acid component, the effect of the present invention is markedly exhibited. From this viewpoint, it is preferable that an alkenylsubstituted succinic acid compound is contained in the carboxylic acid component in an amount of from 5 to 50% by mol.

Incidentally, the alcohol component and the carboxylic acid component each may contain, in addition to the above-mentioned dihydric or higher polyhydric alcohols and dicarboxylic or higher polycarboxylic acid compounds, monohydric alcohols such as hexanol, lauryl alcohol and stearyl alcohol, and monocarboxylic acid compounds such as propionic acid, lauric acid and stearic acid, in order to adjust the molecular weight, polarity, pulverizability and the like.

The polyester resin composition of the present invention can be prepared by a process comprising polycondensing the raw material monomers for the polyester, an alcohol component and a carboxylic acid component, in the presence of a titanium compound and an inorganic phosphorus compound, for instance, at a temperature of 180° to 250° C. in an inert gas atmosphere optionally under reduced pressure; and a process comprising adding an inorganic phosphorus compound to a product prepared by polycondensing the raw material monomers for the polyester, an alcohol component and a carboxylic acid component, in the presence of a titanium compound. The former process is preferable from the viewpoints of the durability and the color reproducibility.

Since the titanium compound having a high activity is used as a catalyst, the low-molecular weight components in the polyester are reduced, so that a toner comprising the resulting polyester as a resin binder has an improved durability but an insufficient color reproducibility. Therefore, in the present invention, since the inorganic phosphorus compound coexists with the titanium compound, both the durability and the color reproducibility can be improved. Although the reasons why such effects are obtained by using the inorganic compound together with the titanium compound have not been clear, it is deduced that the homogeneity of the inorganic phosphorus compound in the resin is improved by the reduction of the low-molecular weight components in the resin, and that the homogeneity of the colorant is also improved by the interaction between the inorganic phosphorus compound and a colorant, thereby improving the color reproducibility.

The titanium compound acts as an esterification catalyst for accelerating the polycondensation reaction. It is preferable that the titanium compound is present in the reaction system at the beginning of the polymerization. Incidentally, it is desirable that the inorganic phosphorus compound is added to the reaction system at a stage when a reaction ratio of the raw material monomers reaches preferably from 50 to 95%, more preferably from 80 to 95%, from the viewpoint of suppressing the lowering of the activity of the titanium catalyst. In the present invention, the reaction ratio refers to a value obtained by the equation:

Reaction ratio=Actually produced water (mol)/Theoretical water produced (mol)×100.

The content of the titanium compound in the polyester resin composition of the present invention is preferably from 0.005 to 4% by weight, more preferably from 0.05 to 3% by weight, even more preferably from 0.1 to 2% by weight. Therefore, the amount of the titanium compound used in the preparation of the polyester resin composition of the present invention is preferably from 0.005 to 4 parts by weight or so, more preferably from 0.05 to 3 parts by weight, even more preferably from 0.1 to 2 parts by weight, based on 100 parts by weight of the raw material monomers for the polyester resin.

The content of the inorganic phosphorus compound in the polyester resin composition of the present invention is preferably from 0.001 to 5% by weight, more preferably from 0.05 to 2% by weight. Therefore, the amount of the inorganic phosphorus compound used in the preparation of the polyester resin composition of the present invention is preferably from 0.001 to 5 parts by weight, more preferably from 0.05 to 2 parts by weight, based on 100 parts by weight of the raw material monomers for the polyester resin.

Further, the weight ratio of the titanium compound to the inorganic phosphorus compound (the titanium compound/the inorganic phosphorus compound) is preferably from 0.07 to 5, more preferably from 0.1 to 3, even more preferably from 0.5 to 2.

When the polyester resin composition is prepared, a conventionally known organotin compound such as dibutyltin oxide may be properly used together therewith, within the range in which effects of the present invention are not impaired.

In addition, in order to improve the hydrolytic resistance of the catalyst, the catalyst may be used together with a hydroxide, a carbonate or a fatty acid salt of an alkali metal or an alkaline earth metal, zeolite, and the like as an auxiliary additive.

The polyester resin composition has a softening point of preferably from 90° to 170° C., more preferably from 95° to 150° C. Also, the polyester resin composition has a glass transition point of preferably from 50° to 130° C., more preferably from 50° to 80° C.

Further, in the present invention, there is provided a toner comprising the polyester resin composition of the present invention as a resin binder.

The toner of the present invention may contain as a resin binder a resin other than the above polyester resin composition, an addition polymerization resin such as a styrene-acrylic resin, an epoxy resin, a polycarbonate, a polyurethane, and the like. The content of the polyester resin composition of the present invention is preferably from 50 to 100% by weight, more preferably from 80 to 100% by weight, even more preferably 100% by weight of the binder.

Incidentally, the polyester resin composition of the present invention may be contained in a toner by mixing with a resin other than the polyester resin. Alternatively, the polyester resin composition of the present invention may be contained in a toner as a polyester component in a hybrid resin in which a polyester resin component obtained by using the titanium compound as a catalyst and an addition polymerization resin component, preferably a vinyl resin component, are partially chemically bonded to each other. Incidentally, the hybrid resin may be obtained by using two or more resins as raw materials, or the hybrid resin may be obtained by using one resin and raw material monomers of the other resin. Further, the hybrid resin may be obtained from a mixture of raw material monomers of two or more resins. In order to efficiently obtain a hybrid resin, those obtained from a mixture of raw material monomers of two or more resins are preferable.

Therefore, the hybrid resin is preferably a resin obtained by mixing raw material monomers for two polymerization resins each having an independent reaction path, preferably raw material monomers for a polyester resin and raw material monomers for an addition polymerization resin, to carry out the two polymerization reactions. Concretely, the hybrid resin described in Japanese Patent Laid-Open No. Hei 10-087839 (corresponding to U.S. Pat. No. 5,908,727) is preferable.

Incidentally, the toner of the present invention may appropriately contain an additive such as a colorant, a charge control agent, a releasing agent, a fluidity improver, an electric conductivity modifier, an extender, a reinforcing filler such as a fibrous substance, an antioxidant, an antiaging agent, and a cleanability improver, in addition to the above polyester resin composition.

As the colorant, all of the dyes, pigments and the like which are used as colorants for toners can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. In the present invention, the toner may be any of black toner, color toner and full-color toner, and preferably color toner or full-color toner because of its excellent color reproducibility. The content of the colorant is preferably from 1 to 40 parts by weight, more preferably from 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quaternary ammonium salt compounds, polyamine resins and imidazole derivatives, and negatively chargeable charge control agents such as metal-containing azo dyes, copper phthalocyanine dyes, metal complexes of alkyl derivatives of salicylic acid and boron complexes of benzilic acid. The toner of the present invention may be either positively chargeable or negatively chargeable. Also, a positively chargeable charge control agent and a negatively chargeable charge control agent may be used together.

The releasing agent includes waxes such as natural ester waxes such as carnauba wax and rice wax; synthetic waxes such as polypropylene wax, polyethylene wax and Fischer-Tropsch wax; coal waxes such as montan wax, alcohol waxes. These waxes may be contained alone or in admixture of two or more kinds.

The process for preparing the toner of the present invention may be any of conventionally known methods such as a kneading-pulverization method and an emulsion phase-inversion method, and the kneading-pulverizing method is preferable from the viewpoint of facilitation in the preparation of the toner. Incidentally, in the case of a pulverized toner prepared by the kneading-pulverizing method, the toner can be prepared by homogeneously mixing a resin binder, a colorant and the like in a mixer such as a ball-mill, thereafter melt-kneading with a closed kneader, a single-screw or twin-screw extruder, or the like, cooling, pulverizing, and classifying. In the emulsion phase-inversion method, the toner can be prepared by dissolving or dispersing a resin binder, a colorant and the like in an organic solvent, thereafter emulsifying the mixture by adding water, or the like, separating and classifying the particles. The toner has a volume-average particle size of preferably from 3 to 15 μm. Further, a fluidity improver such as hydrophobic silica or the like may be added to the surface of the toner as an external additive.

The toner of the present invention can be used alone as a developer, in a case where the fine magnetic material powder is contained. Alternatively, in a case where the fine magnetic material powder is not contained, the toner may be used as a nonmagnetic one-component developer, or the toner can be mixed with a carrier and used as a two-component developer.

EXAMPLES

The following examples further describe and demonstrate embodiments of the present invention. The examples are given solely for the purposes of illustration and are not to be construed as limitations of the present invention.

[Softening Point]

Softening point refers to a temperature corresponding to ½ of the height (h) of the S-shaped curve showing the relationship between the downward movement of a plunger (flow length) and temperature, namely, a temperature at which a half of the resin flows out, when measured by using a "koka" type flow tester, "CAPILLARY RHEOMETER CFT-500D," commercially available from Shimadzu Corporation in which a 1 g sample is extruded through a nozzle having a dice pore size of 1 mm and a length of 1 mm, with heating the sample at a heating rate of 6° C./min and applying a load of 1.96 MPa thereto with the plunger.

[Maximum Peak Temperature for Heat of Fusion and Glass Transition Point]

A maximum peak temperature for heat of fusion is determined with a sample using a differential scanning calorimeter ("DSC Model 210," commercially available from Seiko Instruments, Inc.), when the sample is treated by raising its temperature to 200° C., cooling the sample at a cooling rate of 10° C./min. to 0° C., and thereafter heating the sample at a heating rate of 10° C./min. In the above measurement, the temperature of an intersection of the extension of the baseline in a temperature range equal to or lower than the maximum peak temperature and the tangential line showing the maximum slope between the kickoff of the peak and the top of the peak is referred to as a glass transition point.

Examples 1 to 16 and Comparative Examples 1 to 9

(1) Preparation Examples of Resin Compositions i) Examples Using Raw Material Monomer Compositions A and B A 5-liter four-necked flask equipped with a nitrogen inlet tube, a dehydration tube, a stirrer, and a thermocouple was charged with BPA-PO, BPA-EO and terephthalic acid in the amounts as shown in Table 1 and a catalyst and a phosphorus compound as shown in Table 3, and the ingredients were reacted at 230° C. under nitrogen atmosphere until the reaction ratio reached 90%. Thereafter, the ingredients were reacted at 8.3 kPa until the desired softening point was attained, to give a resin composition.

ii) Examples Using Raw Material Monomer Compositions C and D

A 5-liter four-necked flask equipped with a nitrogen inlet tube, a dehydration tube, a stirrer, and a thermocouple was charged with BPA-PO, BPA-EO, terephthalic acid and dodecenylsuccinic anhydride in the amounts as shown in Table 1 and a catalyst and a phosphorus compound as shown in Table 3, and the ingredients were reacted at 230° C. under nitrogen atmosphere until the reaction ratio reached 90%. Thereafter, trimellitic anhydride was added after reacting at 8.3 kPa for 1 hour. The ingredients were reacted under normal pressure for 1 hour, and then reacted at 8.3 kPa until the desired softening point was attained, to give a resin composition.

iii) Examples Using Raw Material Monomer Composition E

A 5-liter four-necked flask equipped with a nitrogen inlet tube, a dehydration tube, a stirrer, and a thermocouple was charged with BPA-PO and terephthalic acid in the amounts as shown in Table 1 and a catalyst and a phosphorus compound as shown in Table 3, and the ingredients were reacted at 230° C. under nitrogen atmosphere until the reaction ratio reached 90%. Thereafter, the ingredients were reacted under reduced pressure at 8.3 kPa, and then cooled to 180° C. Fumaric acid and hydroquinone were added thereto, and the ingredients were reacted at a temperature of from 180° to 210° C. over a period of 4 hours, and thereafter subjected to by condensation polymerization reaction at 8.3 kPa until the desired softening point was attained, to give a resin composition.

In Example 16, the stage of adding the phosphorus compound was changed to a period in which fumaric acid and hydroquinone were added at 180° C.

iv) Example Using Raw Material Monomer Composition F

A mixture of styrene, acrylic acid, 2-ethylhexyl acrylate and di-t-butyl peroxide as shown in Table 2 was added dropwise to a mixture of BPA-PO, BPA-EO and terephthalic acid in the amounts as shown in Table 2 and a catalyst and a phosphorus compound as shown in Table 3 at 160° C. under nitrogen atmosphere over a period of 1 hour. Further, the resulting mixture was subjected to addition polymerization reaction for 2 hours, and thereafter the temperature was raised to 230° C. The reaction mixture was subjected to condensation polymerization reaction until the desired softening point was attained, to give a resin composition.

v) Example Using Raw Material Monomer Composition G

A 5-liter four-necked flask equipped with a nitrogen inlet tube, a dehydration tube, a stirrer, and a thermocouple was charged with 1,4-butanediol, 1,6-hexanediol, fumaric acid, adipic acid and hydroquinone in the amounts as shown in Table 1 and a catalyst and a phosphorus compound as shown in Table 3, and the ingredients were reacted at 160° C. for 5 hours under nitrogen atmosphere. Thereafter, the temperature was raised in increments of 10° C. every hour to 200° C., and the ingredients were reacted at 200° C. for 1 hour. Further, the ingredients were reacted at 8.3 kPa for 1 hour, to give a resin composition.

vi) Example Using Raw Material Monomer Composition H

A 5-liter four-necked flask equipped with a nitrogen inlet tube, a dehydration tube, a stirrer, and a thermocouple was charged with ethylene glycol, neopentyl glycol and terephthalic acid in the amounts as shown in Table 1 and a catalyst and a phosphorus compound as shown in Table 3, and the ingredients were reacted at a temperature of from 180° to 210° C. over a period of 4 hours under nitrogen atmosphere. Thereafter, trimellitic acid was added, and the ingredients were reacted for 1 hour and then reacted at 8.3 kPa until the desired softening point was attained, to give a resin composition.

The softening point (Tm), and the glass transition point (Tg), or the maximum peak temperature of heat of fusion in the case where the raw material monomer composition G was used, of the resin composition obtained in each of Examples and Comparative Examples are also shown in Table 3.

TABLE 1

| | Raw Material Monomer Composition | | | | | | |
|---|---|---|---|---|---|---|---|
| | A | B | C | D | E | G | H |
| BPA-PO[1] | 2800 g (100.0) | 840 g (24.0) | 2450 g (70.0) | 2450 g (70.0) | 2800 g (100.0) | — | — |
| BPO-EO[2] | — | 2470 g (76.0) | 975 g (30.0) | 975 g (30.0) | — | — | — |
| 1,4-Butanediol | — | — | — | — | — | 1140 g (90.0) | — |
| 1,6-Hexanediol | — | — | — | — | — | 165 g (10.0) | — |
| Ethylene Glycol | — | — | — | — | — | — | 372 g (60.0) |
| Neopentyl Glycol | — | — | — | — | — | — | 416 g (40.0) |
| Terephthalic Acid | 1130 g (85.0) | 1477 g (89.0) | 830 g (50.0) | 747 g (45.0) | 531 g (40.0) | — | 480 g (75.0) |
| Fumaric Acid | — | — | — | — | 556 g (60.0) | 2886 g (85.0) | — |
| Trimellitic Anhydride | — | — | 480 g (25.0) | 480 g (25.0) | — | — | 1245 g (23.5) |
| Dodecenylsuccinic Anhydride | — | — | 670 g (25.0) | 804 g (30.0) | — | — | — |
| Adipic Acid | — | — | — | — | — | 309 g (15.0) | — |
| Hydroquinone | — | — | — | — | 0.5 g | 0.5 g | — |

Note)
The numerical figures in the parentheses are expressed in molar ratios.
[1]Propylene oxide adduct of bisphenol A (2.2 mol)
[2]Ethylene oxide adduct of bisphenol A (2.2 mol)

TABLE 2

| | Raw Material Monomer Composition F |
|---|---|
| Resin Raw Materials A | |
| BPA-PO[1] | 1453 g (50.0) |
| BPO-EO[2] | 1349 g (50.0) |
| Terephthalic Acid | 1171 g (85.0) |
| Resin Raw Materials B | |
| Styrene | 757 g (84.0) |
| Acrylic Acid | 40 g (6.7) |

TABLE 2-continued

| | Raw Material Monomer Composition F |
|---|---|
| 2-Ethylhexyl Acrylate | 144 g (16.0) |
| Di-t-butyl Peroxide | 36 g (4.0) |
| Polyethylene Wax[3] | 939 g |

Note 1) The numerical figures in the parentheses for Resin Materials A are expressed in molar ratio.
Note 2) The numerical figures in the parentheses for Resin Materials B are expressed in weight ratio.
[1] Propylene oxide adduct of bisphenol A (2.2 mol)
[2] Ethylene oxide adduct of bisphenol A (2.2 mol)
[3] "SPRAY 105" (commercially available from Sazole, melting point: 105° C.) The amount used is 20 parts by weight based on 100 parts by weight of the resin prepared.

(2) Preparation Examples of Toners

In each of the raw material monomer compositions as shown in Table 3, 100 parts by weight of a resin composition obtained by using a catalyst and a phosphorus compound as shown in Table 3, 3 parts by weight of "Pigment Yellow 17" in a yellow toner, 6 parts by weight of "Pigment Red 122" in a magenta toner, or 3 parts by weight of "Pigment Blue 15:3" in a cyan toner, as a colorant, 2 parts by weight of "carnauba wax C1" (commercially available from K.K. Kato Yoko, melting point: 73° C.) as a releasing agent and 2 parts by weight of "BONTRON E-84" (commercially available from Orient Chemical Co., Ltd.) as a charge control agent were sufficiently mixed with a Henschel mixer. Thereafter, the mixture was melt-kneaded with a co-rotating twin-screw extruder in which the temperature inside the roller was heated to 100° C. The resulting kneaded mixture was cooled and roughly pulverized, and thereafter pulverized with a jet mill and classified, to give a powder having a volume-average particle size of 8.0 μm.

Two parts by weight of "HDK H2000" (commercially available from Wacker Chemicals) were added as an external additive to 100 parts by weight of the resulting powder, and the ingredients were mixed with a Henschel mixer, thereby subjecting the powder to a surface treatment, to give a yellow toner, a magenta toner, or a cyan toner.

Test Example 1 [Degree of Coloration of Resin]

i) The amount 0.5 g of a resin composition obtained was placed on a slide glass, and heated on a hot plate at 180° C. for 3 minutes. The melted product was covered with another slide glass, to fix it. $L^*$ Value, $a^*$ value and $b^*$ value were determined with Chroma Meter "CR-321" (commercially available from MINOLTA CO., LTD.).

ii) The $L^*$ value, $a^*$ value and $b^*$ value for the slide glass were determined as a blank in the same manner as in the above i).

The difference of the values ($\Delta E$) between i) and ii) was obtained using the following equation. The degree of coloration of resin composition was evaluated according to the following evaluation criteria. The results are shown in Table 3.

$$\Delta E = \sqrt{(L_1^* - L_2^*)^2 + (a_1^* - a_2^*)^2 + (b_1^* - b_2^*)^2}$$

wherein each of $L_1^*$, $a_1^*$ and $b_1^*$ is a value determined in i), and each of $L_2^*$, $a_2^*$ and $b_2^*$ is a value determined in ii).

[Evaluation Criteria]

⊚: $\Delta E$ is less than 4;

○: $\Delta E$ is 4 or more and less than 7;

Δ: $\Delta E$ is 7 or more and less than 10; and x: $\Delta E$ is 10 or more.

Test Example 2 [Durability]

A developer obtained by mixing 3 parts by weight of a toner and 97 parts by weight of a silicon-coated ferrite carrier (commercially available from Kanto Denka Kogyo Co., Ltd.) was loaded to "PRETER 550" (commercially available from Ricoh Company, Ltd.), and a continuous printing was carried out for a fixed image having a printing ratio of 5% for 10 hours. Thereafter, the developer was taken out, and the toner portion was aspirated from the developer using a sieve having a sieve-opening of 32 μm, to leave only the carrier portion. The carbon content of the resulting carrier was determined using a carbon analyzer "EMIA-110" (commercially available from HORIBA, LTD.). The ratio of the carbon content obtained to the carbon content of the carrier previously determined before mixing with the toner was calculated, and the increased amount was evaluated as durability according to the following evaluation criteria. Specifically, the larger the increased amount in the carbon content, the larger the amount of the toner adhered to the carrier, so that it can be judged to have worsened durability of the toner. The results are shown in Table 3.

[Evaluation Criteria for Durability]

The increased amount in the carbon content is:

⊚: less than 0.05;

○: 0.05 or more and less than 0.1; and x: 0.1 or more.

Test Example 3 [Color Reproducibility]

A yellow toner, a magenta toner and a cyan toner obtained in Examples and Comparative Examples were loaded in the same amount onto a nonmagnetic, monocomponent developing device "Tektronics Phaser 560" (commercially available from Sony Tektronics) comprising a heat roll. The amount of each of the yellow toner, the magenta toner and the cyan toner adhered was adjusted to 0.6 mg/cm² by controlling the development bias, to give a yellow solid image, a magenta solid image, a cyan solid image, a processed red solid image, a processed green solid image and a processed blue solid image. The $a^*$ value and $b^*$ value of each image were determined with "X-Rite 938" (commercially available from X-Rite), and the $a^*$ value and the $b^*$ value were plotted on a chromaticity diagram of the $a^*$ value and the $b^*$ value. The color reproducibility was evaluated according to the following evaluation criteria, based on the hexagonal area obtained. The results are shown in Table 3.

[Evaluation Criteria for Color Reproducibility]

The relative value of the hexagonal area is:

⊚: 6000 or more;

○: 3500 or more and less than 6000; and x: less than 3500.

TABLE 3

| | Raw Material Monomer Composition | Catalyst Kind | Catalyst Amount Used | Phosphorus Compound Kind | Phosphorus Compound Amount Used | Tm (°C) | Tg (°C) | Degree of Coloration | Durability | Color Reproducibility |
|---|---|---|---|---|---|---|---|---|---|---|
| Group A | | | | | | | | | | |
| Comp. Ex. 1 | A | C1 | 0.3 | — | — | 101.2 | 64.3 | X | ◉ | X |
| Comp. Ex. 4 | A | C1 | 0.001 | P1 | 0.3 | 100.5 | 63.2 | ○ | X | ○ |
| Ex. 5 | A | C1 | 0.01 | P1 | 0.01 | 99.8 | 63.1 | ○ | ○ | ○ |
| Ex. 1 | A | C1 | 0.3 | P1 | 0.3 | 101.6 | 64.0 | ○ | ◉ | ◉ |
| Ex. 4 | A | C1 | 3.0 | P1 | 3.0 | 102.7 | 64.8 | Δ | ◉ | ○ |
| Ex. 6 | A | C1 | 0.05 | P1 | 0.55 | 100.3 | 65.1 | ◉ | ○ | ◉ |
| Comp. Ex. 2 | A | C1 | 0.3 | P1 | 6.0 | 102.1 | 64.0 | ◉ | X | ◉ |
| Comp. Ex. 3 | A | C1 | 5.0 | P1 | 0.3 | 101.5 | 63.9 | Δ | ○ | X |
| Group B | | | | | | | | | | |
| Comp. Ex. 7 | C | C4 | 0.3 | — | — | 103.8 | 62.7 | X | X | ○ |
| Comp. Ex. 8 | C | C1 | 0.3 | — | — | 105.2 | 63.5 | X | ○ | X |
| Ex. 10 | C | C1 | 0.3 | P1 | 0.3 | 105.1 | 63.2 | X | ◉ | ○ |
| Group C | | | | | | | | | | |
| Ex. 2 | A | C1 | 0.3 | P2 | 0.3 | 103.1 | 65.2 | ○ | ◉ | ○ |
| Ex. 3 | A | C1 | 0.3 | P3 | 0.3 | 102.6 | 64.9 | ○ | ◉ | ○ |
| Group D | | | | | | | | | | |
| Ex. 7 | A | C2 | 0.3 | P1 | 0.3 | 103.4 | 64.3 | ○ | ○ | ◉ |
| Ex. 8 | A | C3 | 0.3 | P1 | 0.3 | 102.1 | 63.2 | Δ | ○ | ○ |
| Group E | | | | | | | | | | |
| Comp. Ex. 5 | A | C4 | 0.3 | — | — | 103.1 | 64.2 | ○ | X | ○ |
| Comp. Ex. 6 | A | C4 | 0.3 | P1 | 0.3 | 98.6 | 63.3 | ○ | X | ○ |
| Group F | | | | | | | | | | |
| Ex. 9 | B | C1 | 0.3 | P1 | 0.3 | 107.3 | 65.1 | ○ | ◉ | ◉ |
| Ex. 11 | D | C1 | 0.3 | P1 | 0.3 | 137.3 | 67.3 | X | ◉ | ○ |
| Ex. 12 | E | C1 | 0.3 | P1 | 0.3 | 110.7 | 64.8 | Δ | ◉ | ◉ |
| Ex. 13 | F | C1 | 0.3 | P1 | 0.3 | 112.8 | 58.8 | ○ | ○ | ◉ |
| Ex. 14 | G | C1 | 0.3 | P1 | 0.3 | 112.3 | 114.6 | ○ | ◉ | ○ |
| Ex. 15 | H | C1 | 0.3 | P1 | 0.3 | 143.1 | 66.2 | ○ | ◉ | ○ |
| Group G | | | | | | | | | | |
| Ex. 16 | E | C1 | 0.3 | P1 | 0.3 | 112.3 | 65.3 | Δ | ◉ | ◉ |
| Group H | | | | | | | | | | |
| Comp. Ex. 9 | A | C1 | 0.3 | P4 | 0.3 | 98.8 | 64.2 | Δ | X | X |

Note)
The amounts of the catalyst and the phosphorus compound used are expressed in weight ratio based on 100 parts by weight of the raw material monomers for the resin composition.

The catalysts and the phosphorus compounds as shown in Table 3 are shown in shown in Table 4.

TABLE 4

| Catalyst | |
|---|---|
| C1 | Titanium Diisopropylate Bis(triethanolaminate) |
| C2 | Tetrastearyl Titanate |
| C3 | Tetrabutyl Titanate |
| C4 | Dibutyltin Oxide |
| Phosphorus Compound | |
| P1 | Polyphosphoric Acid [1] |
| P2 | Sodium Polyphosphate [2] |
| P3 | Sodium Ultrapolyphosphate [3] |
| P4 | Triphenyl phosphine |

[1] Commercially available from Wako Pure Chemical Industries, number-average molecular weight: 580
[2] Commercially available from Kanto Kagaku, number-average molecular weight: 124
[3] Commercially available from Kanto Kagaku, number-average molecular weight: 330

1) Commercially available from Wako Pure Chemical Industries, number-average molecular weight: 580
2) Commercially available from Kanto Kagaku, number-average molecular weight: 124

3) Commercially available from Kanto Kagaku, number-average molecular weight: 330

It can be seen from the above results that all of the toners of Examples are excellent in the durability, and have an excellent color reproducibility as full-color toners.

In Group A, there are a tendency that the larger the amount of the titanium compound in proportion to the inorganic phosphorus compound, the higher the durability of toner, and the worse the degree of coloration of resin composition and the color reproducibility of toner, and a tendency that the larger the amount of the inorganic phosphorus compound in proportion to the titanium compound, the worse the durability of toner, and the more excellent the degree of coloration of resin composition and the color reproducibility of the toner.

In Group B, in the case where dodecenylsuccinic anhydride is used as a raw material monomer for a polyester, if a tin catalyst is used, the color reproducibility is excellent but the degree of coloration of the resin composition is worsened, and if only a titanium compound is used, not only the degree of coloration of the resin composition but also the color reproducibility are worsened. On the contrary, by the combined use of the titanium compound and the inorganic phosphorus compound, an excellent color reproducibility can be obtained, regardless of the degree of coloration of the resin composition.

It can be seen in Group E that if a tin catalyst is used, there are no substantial changes in the results obtained even when a phosphorus compound is combinably used.

According to the present invention, there can be provided a polyester resin composition for a toner, which is excellent in the durability, and is excellent in color reproducibility when used as a resin binder for a color toner or a full-color toner, and a toner comprising the resin composition.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A toner comprising a polyester resin comprising:
the product of condensing raw material monomers in the presence of 0.005 to 4% by weight of a titanium compound catalyst and 0.001 to 5% by weight of an inorganic phosphorus compound, wherein said titanium compound catalyst is represented by the formula (II):

$$Ti(Z)_4 \qquad (II)$$

wherein Z is an alkoxy group having a total number of carbon atoms of from 8 to 18, wherein the four kinds of Z may be identical or different from each other, and
wherein said inorganic phosphorus compound is a polyphosphoric acid or a salt thereof having a number-average molecular weight of from 110 to 1000.

2. The toner of claim 1, wherein a weight ratio of the titanium compound to the inorganic phosphorus compound is from 0.07 to 5.

3. The toner of claim 1, which is prepared by using as raw material monomers for the polyester an alcohol component comprising an alcohol having a bisphenol A adduct in an amount of from 10 to 100% by mol and a carboxylic acid component.

4. The toner of claim 1, which is prepared by using as raw material monomers for the polyester an alcohol component and a carboxylic acid component an alkenyl-substituted succinic acid compound of which alkenyl group has 2 to 20 carbon atoms.

5. The toner of claim 1, wherein the softening point of the polyester resin composition is from 90° to 170° C.

* * * * *